United States Patent
Sayyar-Rodsari et al.

(10) Patent No.: US 10,067,485 B2
(45) Date of Patent: Sep. 4, 2018

(54) INTEGRATED OPTIMIZATION AND CONTROL FOR PRODUCTION PLANTS

(71) Applicant: ROCKWELL AUTOMATION TECHNOLOGIES, INC., Mayfield Heights, OH (US)

(72) Inventors: Bijan Sayyar-Rodsari, Austin, TX (US); Carl Anthony Schweiger, Round Rock, TX (US)

(73) Assignee: Rockwell Automation Technologies, Inc., Mayfeield Heights, OH (US)

( * ) Notice: Subject to any disclaimer, the term of this patent is extended or adjusted under 35 U.S.C. 154(b) by 416 days.

(21) Appl. No.: 14/860,367

(22) Filed: Sep. 21, 2015

(65) Prior Publication Data

US 2016/0011572 A1    Jan. 14, 2016

Related U.S. Application Data (63) Continuation of application No. 12/609,785, filed on Oct. 30, 2009, now Pat. No. 9,141,098.

(51) Int. Cl.
   *G05B 13/04*    (2006.01)
(52) U.S. Cl.
   CPC ................... *G05B 13/04* (2013.01)
(58) Field of Classification Search
   CPC ...................................... G05B 13/04
   See application file for complete search history.

(56) References Cited

U.S. PATENT DOCUMENTS

| | | | |
|---|---|---|---|
| 5,486,995 A | 1/1996 | Krist et al. | |
| 5,666,297 A | 9/1997 | Britt et al. | |
| 5,781,432 A * | 7/1998 | Keeler | G05B 13/0285 700/44 |
| 6,038,540 A | 3/2000 | Krist et al. | |

(Continued)

OTHER PUBLICATIONS

Tosukhowong, Thidarat, "Dynamic Real-Time Optimization and Control of an Integrated Plant", Thesis, Georgia Tech, Dec. 2006.

(Continued)

*Primary Examiner* — Nathan L Laughlin
(74) *Attorney, Agent, or Firm* — Fletcher Yoder, P.C.

(57) ABSTRACT

The present invention provides novel techniques for optimizing and controlling production plants using parametric multifaceted models. In particular, the parametric multifaceted models may be configured to convert a first set of parameters (e.g., control parameters) relating to a production plant into a second set of parameters (e.g., optimization parameters) relating to the production plant. In general, the first set of parameters will be different than the second set of parameters. For example, the first set of parameters may be indicative of low-level, real-time control parameters and the second set of parameters may be indicative of high-level, economic parameters. Utilizing appropriate parameterization may allow the parametric multifaceted models to deliver an appropriate level of detail of the production plant within a reasonable amount of time. In particular, the parametric multifaceted models may convert the first set of parameters into the second set of parameters in a time horizon allowing for control of the process plant by a control system based on the second set of parameters.

17 Claims, 6 Drawing Sheets

(56) References Cited

U.S. PATENT DOCUMENTS

| | | |
|---|---|---|
| 6,122,555 A | 9/2000 | Lu |
| 6,381,505 B1 | 4/2002 | Kassmann et al. |
| 6,434,435 B1 | 8/2002 | Tubel et al. |
| 6,442,513 B1 | 8/2002 | Cheng et al. |
| 7,050,863 B2 | 5/2006 | Mehta et al. |
| 7,194,318 B2 | 3/2007 | Attarwala |
| 7,257,451 B2 | 8/2007 | Carpency et al. |
| 7,330,767 B2 | 2/2008 | Thiele et al. |
| 7,337,022 B2 | 2/2008 | Wojsznis et al. |
| 7,376,472 B2 | 5/2008 | Wojsznis et al. |
| 2003/0097194 A1 | 5/2003 | Gade et al. |
| 2003/0097243 A1 | 5/2003 | Mays et al. |
| 2005/0187643 A1 | 8/2005 | Sayyar-Rodsari et al. |
| 2007/0156288 A1 | 7/2007 | Wroblewski et al. |
| 2008/0108048 A1 | 5/2008 | Bartee et al. |

OTHER PUBLICATIONS

Yliniemi, LEENa: "Advanced Control of a Rotary Dryer"; Department of Process Engineering, University of Oulu, Oulu, Finland, May 1999.

Extended European Search Report for related European Application No. 10189335.2, dated Feb. 11, 2011, 6 pgs.

\* cited by examiner

INTEGRATED OPTIMIZATION AND CONTROL FOR PRODUCTION PLANTS

CROSS-REFERENCE TO RELATED APPLICATION

This application is a continuation of U.S. patent application Ser. No. 12/609,785, which was filed on Oct. 30, 2009, which is incorporated by reference herein in its entirety for all purposes.

BACKGROUND

The present invention relates generally to control systems and, more particularly, to integrated optimization and control for production plants using parametric multifaceted models.

Integrated optimization and control of process plants has long been of interest due to the potential economic benefits that such an approach could offer. A number of solutions have been proposed in the past and some commercially available software offerings have attempted to meet the enormous demand for such solutions. However, some key technological challenges to the implementation of such solutions have persisted, including: (1) inconsistencies between plant optimization and plant control solutions, (2) computational complexity of the integrated optimization and control solution, and (3) scalability and maintainability of the integrated solution for complex process plants.

BRIEF DESCRIPTION

The present invention provides novel techniques for optimizing and controlling production plants using parametric multifaceted models. In particular, the parametric multifaceted models may be configured to maintain the consistency of a first set of parameters (e.g., parameters of a dynamic model used for control) relating to a production plant with a second set of parameters (e.g., parameters of an economic model used for economic optimization) relating to the production plant. In general, the first set of parameters will be different than the second set of parameters. For example, the first set of parameters may be indicative of low-level, real-time control parameters and the second set of parameters may be indicative of high-level, economic parameters. Utilizing appropriate parameterization may allow the parametric multifaceted models to deliver an appropriate level of detail of the production plant for the decision-making context within a reasonable amount of time. In particular, the parametric multifaceted models may map the first set of parameters into the second set of parameters in a time horizon allowing for control of the process plant by a control system based on the second set of parameters. In certain embodiments, the mapping may be a function of current and/or anticipated operating conditions of the process plant.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
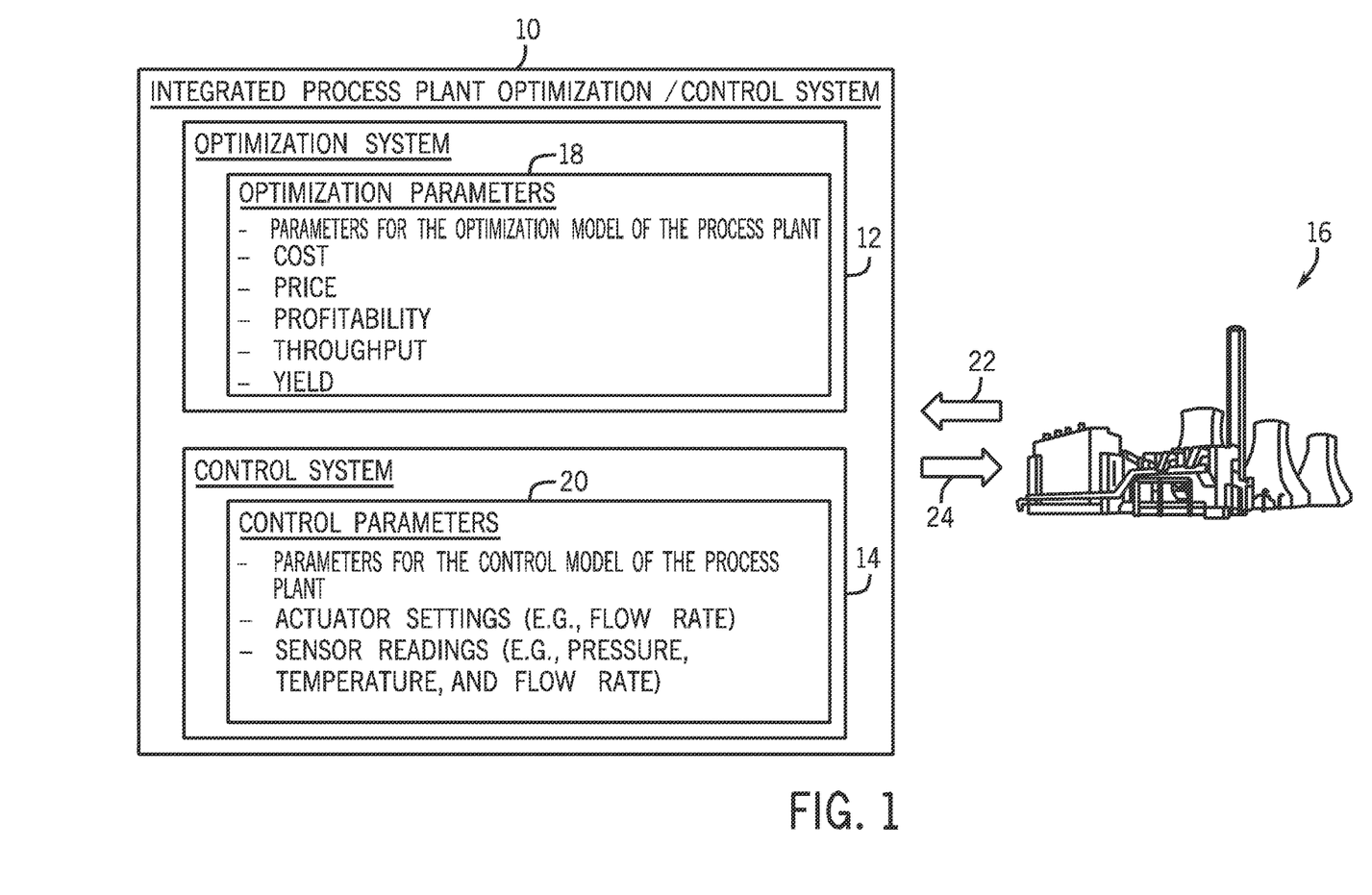
FIG. 1 is a block diagram of an exemplary embodiment of an integrated process plant optimization and control system.

Turning now to the drawings, and referring first to FIG. 1, an integrated process plant optimization and control system 10 is illustrated. The integrated process plant optimization and control system 10 may include both an optimization system 12 and a control system 14. The optimization system 12 may generally be used to optimize the operations of one or more process plants 16 of the integrated process plant optimization and control system 10. For example, the optimization system 12 may typically be used by plant managers, regional managers, and other high-level executives to optimize the operations of the one or more process plants 16. As such, the optimization parameters 18 typically used in conjunction with the optimization system 12 may include cost data (e.g., of material inputs), price data (e.g., of manufactured outputs), profitability of individual plants, overall profitability, throughput constraints of individual plants, overall throughput constraints, yield models of individual plants, overall yield models, equipment efficiency, and so forth. Conversely, the control system 14 may generally be used to control the operations of the one or more process plants 16 of the integrated process plant optimization and control system 10. As such, the control parameters 20 typically used in conjunction with the control system 14 may include parameters of the process plant 16 model (e.g. reaction rates for a fermentation process, process gains, process residence times, and so forth) that may depend on process plant measurements (e.g. sensor readings, such as measurements of temperatures, pressures, flow rates), actuator settings, and so forth.

In other words, the optimization system 12 and the control system 14 may function on two different levels. For example, the optimization system 12 may be concerned with optimizing the performance of the one or more process plants 16. As such, the optimization system 12 may receive process outputs 22 and process inputs 24 from the one or more process plants 16, to modify the optimization parameters 18 of an appropriate model of the process plants 16, which is used by the optimization system 12. These optimization parameters 18 may then be used to optimize the one or more process plants 16 by, for instance, modifying process inputs 24 which may be sent to the one or more process plants 16. Conversely, the control system 14 may be concerned with low-level, real-time control of the one or more process plants 16. As such, the control system 14 may receive the process outputs 22 and process inputs 24 from the one or more process plants 16, to modify the control parameters 20. These control parameters 20 may then be used to control the one or more process plants 16 by, for instance, modifying the process inputs 24 which may be sent to the one or more process plants 16. The consistency of the decisions by the optimization system 12 and the control system 14, as described in greater detail below, may be more effectively maintained if the control parameters 20 and the optimization parameters 18 remain consistent. The parametric multifaceted model described herein maintains this consistency by treating the optimization parameters 18 and the control parameters 20 as different facets of an underlying multifaceted model, where the mapping between various facet parameters is an integral part of the multifaceted model.

It should be noted that, although the disclosed embodiments focus on parameterization between the optimization system 12 and the control system 14, the disclosed embodiments may be extended to parameterization between any number of systems utilizing different facets of a multifaceted model. Indeed, multiple levels of parameterization (e.g., parameterization between a first and second sets of parameters, parameterization between the second set of parameters and a third set of parameters, parameterization between the third set of parameters and a fourth set of parameters, and so forth) may be utilized by the integrated process plant optimization and control system 10.

A main objective of the integrated process plant optimization and control system 10 is to enable real-time, integrated optimization and control of a complex process plant 16, and to address the real-world challenges that have hindered successful deployment of such solutions in process plants 16. As discussed above, in the past, some of the key technological challenges to the implementation of the integrated process plant optimization and control system 10 were: (1) inconsistencies between the optimization system 12 and the control system 14, (2) computational complexity of the integrated process plant optimization and control system 10, and (3) scalability and maintainability of the integrated process plant optimization and control system 10 for complex process plants 16.

Inconsistencies between the optimization system 12 and the control system 14 may be a problem in that the optimization system 12 may often produce solutions that the control system 14 finds infeasible to execute. Several factors may contribute to these inconsistencies. For instance, as described above, the models for optimization and control may be fundamentally different, and may be deployed in complete isolation from one another. For example, a detailed dynamic model used by the control system 14 (e.g., a first principles model of the physical interactions of the process plant 16) may not be particularly relevant to the optimization system 12, which may only be interested in optimizing, for example, economic attributes of the process plant 16. A framework for generating and maintaining a consistent set of models for appropriate contexts is provided by the disclosed embodiments to address these inconsistencies.

Furthermore, when a process plant 16 includes batch-type processing, the modeling challenge may be further complicated by the fact that, oftentimes, the real measure of batch success or failure may only be assessed at the termination of the batch process. However, the batch outcome may be influenced by how the batch progresses over the duration of the batch process. In other words, the optimization system 12 may only be able to identify success or failure of the batch process once the batch process is complete. However, the control system 12 may need to monitor and control the batch process during the entire batch process. As such, the continuous measurement of the batch process should correlate with the eventual batch outcome. The disclosed embodiments enable different processes throughout the process plant 16 to be optimized and controlled based on parameterized information appropriate for both the particular level of optimization and control and differing time constraints.

In addition, outdated and inaccurate operation constraints will be minimized by the disclosed embodiments. The correct communication of constraint information is not simply a matter of timely communication of information. Rather, process plants 16 are dynamic entities, and proper optimization of the process operation setpoints requires adequate handling of the process plant dynamics. For example, the process plant dynamics may vary as a function of operating conditions of the process plant 16, and failure to properly account for this variation could lead to infeasible targets for the completion of tasks, adversely affecting the overall performance of the integrated process plant optimization and control system 10.

Computational complexity of the integrated process plant optimization and control system 10 may be a problem due to the highly complex nature of process plants 16. As such, process plant optimization and control generally cannot be carried out using a single formulation. In particular, attempting to do so may yield a computationally infeasible optimization solution given the complexity of process plants 16 and the requirements for timely conclusion of the optimization. More specifically, the problem description for economic optimization of the process plant 16 used by the optimization system 12 may typically be expressed as a linear programming problem with integer decision variables whereas the control problem used by the control system 14 may typically include non-linear programming (containing quadratic costs, time-varying non-linear dynamics, and potentially time-varying constraints) with continuous decision variables. The disclosed embodiments accommodate appropriate problem description at each level, enable programmatic modification of the models, and enable the inclusion of appropriate solver technology.

The scalability and maintainability of the integrated process plant optimization and control system 10 for complex process plants 16 may be affected by several main considerations. For example, the enormous size of the mathematical representations of the process plant 16 used by the control system 14, the diversity of the model types (e.g. first-principles and empirical models, dynamic and steady-state models, mass and energy balance equations) used by the control system 14, and the diversity of objectives and constraints used by the optimization system 12 present significant challenges. The disclosed embodiments enable manageable integration, modification, and consolidation of the diverse models.

In addition, the need for timely results from the optimization system 12 for online deployment of the integrated process plant optimization and control system 10 makes computational efficiency a critical requirement. Maintaining this computational efficiency as the problem size grows is critical for a viable solution in any real process plant 16.

Figure 2:
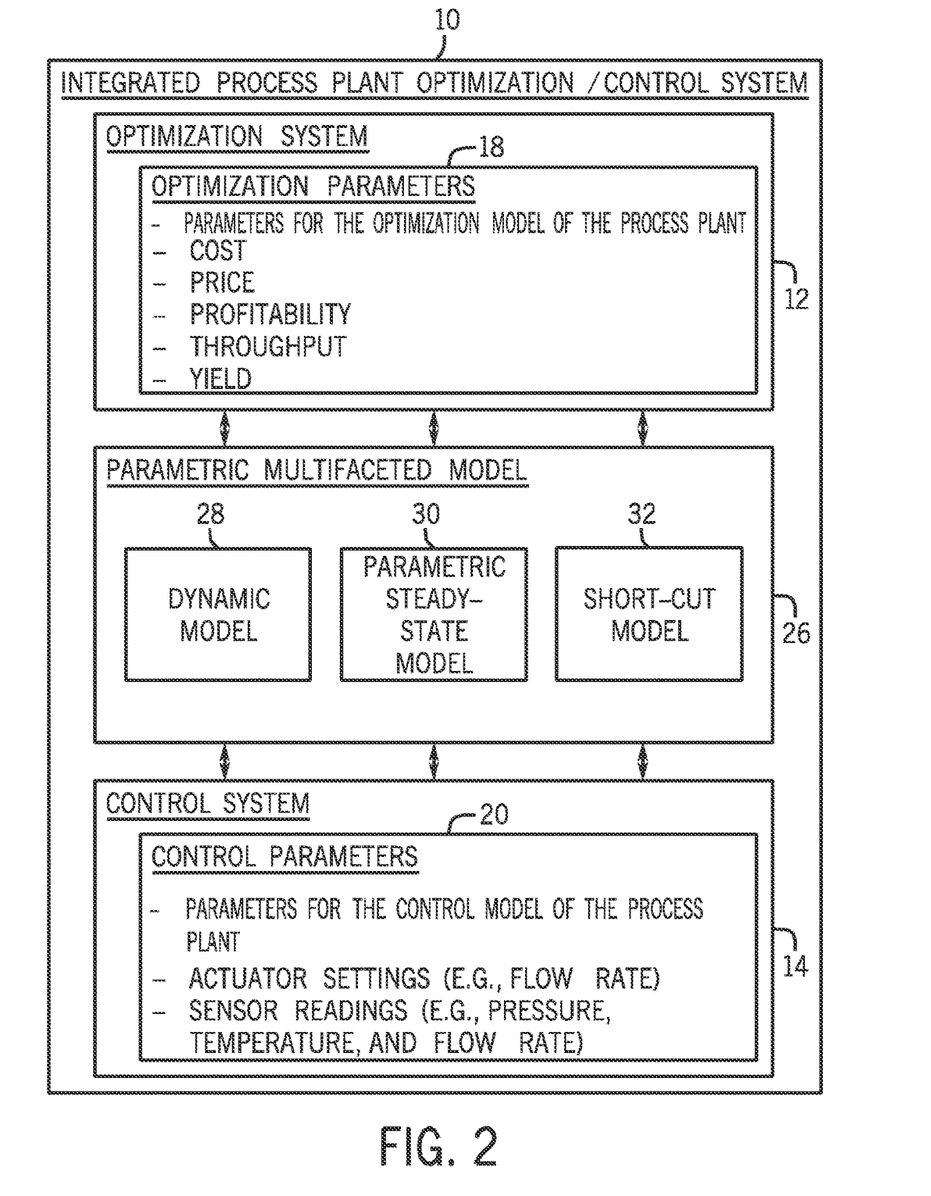
FIG. 2 is a block diagram of an exemplary embodiment of the integrated process plant optimization and control system of FIG. 1 having a parametric multifaceted model.

FIG. 2 is a block diagram of an exemplary embodiment of the integrated process plant optimization and control system 10 of FIG. 1 having a parametric multifaceted model 26, which is configured to address the technological challenges discussed above. The parametric multifaceted model 26 may be for an individual process plant 16 or multiple process plants 16 which may be optimized by the optimized system 12. Using the parametric multifaceted model 26, the integrated process plant optimization and control system 10 may always have appropriate modeling available for the specific process. The parametric multifaceted model 26 may be stored on a machine readable memory medium of a computer system, and executed by a processor using program instructions to implement the operations described herein.

In particular, a main challenge addressed by the parametric multifaceted model 26 is the compromise between accuracy and computational efficiency within the context of the relevant optimization problem. For example, while a detailed non-linear dynamic model of a reactor may be required by the control system 14 for a control strategy to work for the reactor, the details of the non-linear dynamics are not necessarily required by the optimization system 12 when one determines the production level at which the reactor must operate. Therefore, the parametric multifaceted model 26 may be used to represent an appropriate level of detail for the process plant 16, depending on the particular optimization or control function.

For example, the parametric multifaceted model 26 for a process plant 16 may include a detailed dynamic model 28 of the process plant 16. The dynamic model 28 may, for instance, be suitable for use by a model predictive control (MPC) controller. The parametric multifaceted model 26 may also include a parametric steady-state model 30 of the process plant 16. The parametric steady-state model 30 may, for instance, be suitable for use in a set-point/what-if scenario analysis. The parametric multifaceted model 26 may also include a "short-cut" model 32, which may, for instance, be a parametric mass and energy balance model in the form of an open-equation that is suitable for process plant optimization. Each model may be treated as a view into the underlying process and the consistency between the different views may be maintained by a parametric multifaceted mapping in a hybrid modeling framework, as described in greater detail below.

In a simplified scenario, the process plant 16 would have a single model representing its dynamic model 28, parametric steady-state model 30, and short-cut model 32. For example, a simple gain, time constant, time-delay description of a vessel (e.g., a tank) or other piece of equipment in a process plant 16 may provide appropriate information for the dynamic model 28, the parametric steady-state model 30, and the short-cut model 32 of the vessel. However, this simplified scenario may not be applicable and/or desirable in all circumstances. In this instance, the dynamic models 28, parametric steady-state models 30, and short-cut models 32 may be tied to each other via parametric multifaceted mapping in a multi-faceted model. In other words, the parametric multifaceted mappings may be secondary models which relate the primary models to each other.

A key advantage of the parametric multifaceted model 26 is the ability to systematically build consistent models for various optimization contexts of interest for a process plant 16. The parametric multifaceted model 26 may be a key enabling technology for the integration of planning, scheduling, sequencing, and control in a manufacturing enterprise. For example, the parametric multifaceted model 26 may be capable of generating relevant parameters for the optimization system 12 over a time horizon enabling optimization of the process plant 16 in a timely manner.

Figure 3:
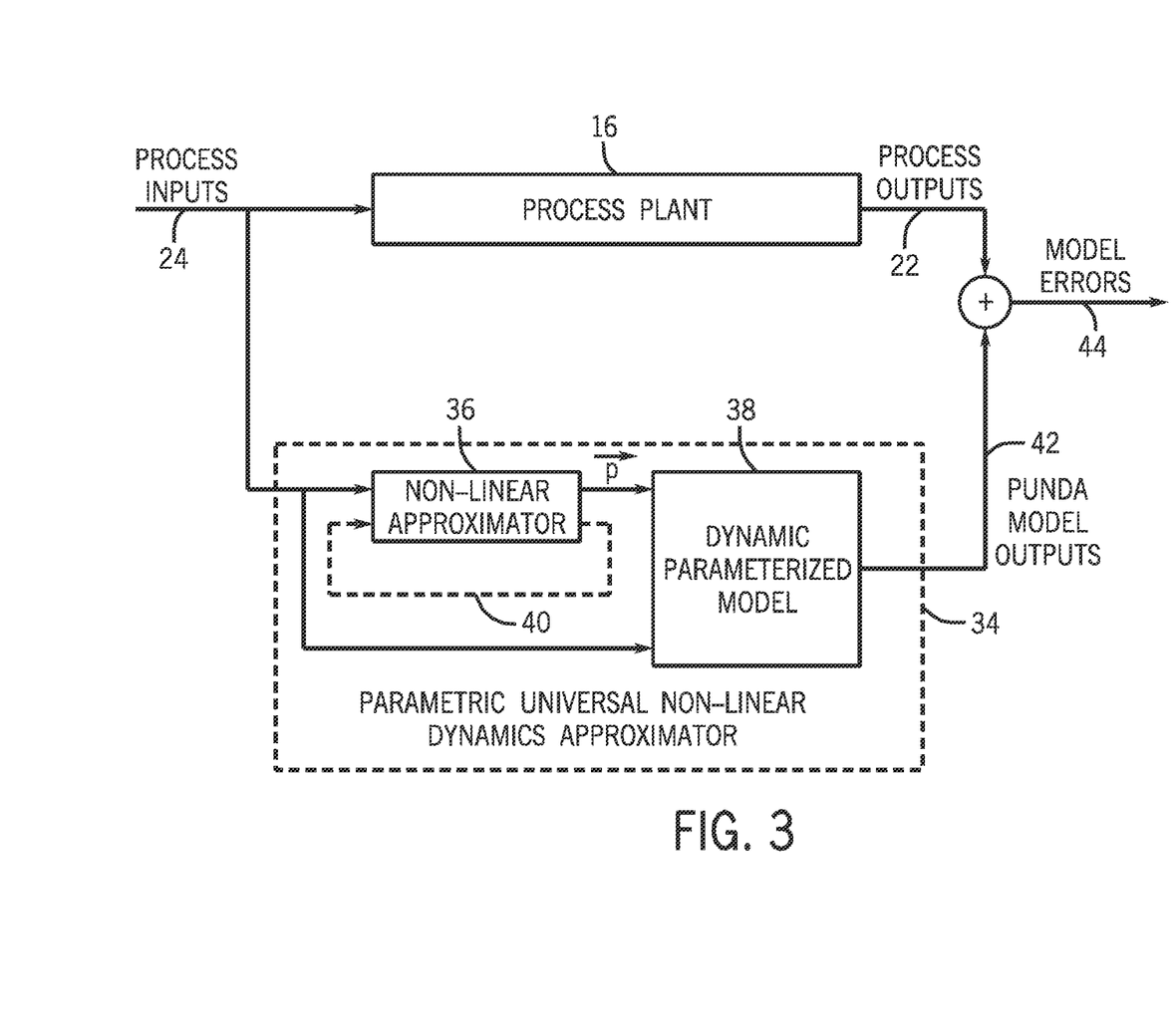
FIG. 3 is a block diagram of an exemplary embodiment of a parametric non-linear dynamic approximator (PUNDA) model, coupled to a physical process or a representation thereof, for purposes of training the PUNDA model for use with the parametric multifaceted model of FIG. 2.

Parametric non-linear dynamic approximator (PUNDA) models may be used as an accurate and computationally efficient representation for the complex dynamic behavior of the process plant 16. The fundamental concepts of PUNDA models can be found in U.S. Patent Application Number 2005/0187643, which is hereby incorporated by reference. In particular, FIG. 3 is a high-level block diagram of an exemplary embodiment of a PUNDA model 34, coupled to the process plant 16 or a representation thereof, for the purpose of training the PUNDA model 34 for use with the parametric multifaceted model 26 of FIG. 2. The PUNDA model 34 may be stored on a memory medium of a computer system, and executed by a processor using program instructions to implement the operations described herein.

In the embodiment illustrated in FIG. 3, the PUNDA model 34 includes a non-linear approximator 36 coupled to a dynamic parameterized model 38 in series. In certain embodiments, the non-linear approximator 36 may be a support vector machine, neural network, statistical model, parametric description, Fourier series model, or any other type of empirical or data based model. The non-linear approximator 36 may be a universal non-linear approximator, such that any type of non-linear mapping may be implemented. The non-linear approximator 36 operates to provide parameters $\vec{p}$ to the dynamic parameterized model 38, as shown. As indicated, in certain embodiments, the non-linear approximator 36 may also include a feedback loop 40, whereby the output of the non-linear approximator 36 is provided as further input to itself, thus supporting dependencies of the output upon prior output of the non-linear approximator 36. In certain embodiments, the dynamic parameterized model 38 may be a multi-input, multi-output (MIMO) dynamic model implemented with a set of difference equations (e.g., a set of discrete time polynomials), an example of which is provided below. Thus, the dynamic parameterized model 38 may receive its parameters $\vec{p}$ from the non-linear approximator 36, and operate accordingly.

As illustrated in FIG. 3, the PUNDA model 34 may be coupled to the process plant 16 or a representation of the process plant 16. Process inputs 24 may be provided to the process plant 16 and to the PUNDA model 34 as inputs. The process plant 16 produces process outputs 22, which may be combined or used with PUNDA model outputs 42 to determine model errors 44, as shown. These model errors 44 may then be provided back to the PUNDA model 34 and used (e.g., with an optimizer) to train the PUNDA model 34. The PUNDA model 34 is described herein in terms of a series combination of a non-linear model and a set of MIMO difference equations that can be used to model any complex non-linear dynamic system with any desired degree of accuracy. Although, as noted above, other non-linear approximators and dynamic parameterized models are also contemplated.

For example, in various embodiments, the process plant 16 of FIG. 3 may be described or represented by the process plant 16 itself, a first principles model, empirical data, or a combination thereof, among others. Examples of first principles models include a state space description of the process plant 16 in the form of $x_{k+1}=F_k(x_k, u_k, p_k)$, $y_k=G_k(x_k, u_k, p_k)$, or input/output difference equations in the form of $y_k=G_k(y_{k-1}, \ldots, y_{k-N}, u_k, \ldots, u_{k-M}, p_k)$. Here, $x_k$ is the state vector, $u_k$ is the input vector (manipulated or disturbance variables), $p_k$ is the parameter vector, and $y_k$ is the output vector for the process plant 16. Examples of empirical data include test data for all process inputs and outputs 24, 22, or correlated measurements from normal operation of the process plant 16 for certain input and output pairs. Other representations are also contemplated including, for example, statistical models, parametric descriptions, Fourier series models, and empirical models, among others.

The PUNDA model 34 allows the empirical information and/or the first principles knowledge available about the process plant 16 to be systematically used in building a computationally favorable (i.e., efficient) model of the process plant 16 that is suitable for online optimization and control of the process plant 16. In other words, the computations may be made in substantially real time. Additionally, the PUNDA model 34 may be capable of approximating the non-linear process plant 16 with any desired degree of accuracy, as will be described in detail below.

It is noted that partial first principle models that, by themselves, are not sufficient to fully describe the process plant 16 could be used to build a representative model of the process plant 16 with the PUNDA model 34. The non-linear approximator 36 in the PUNDA model 34 may be trained while it is serially connected to the dynamic parameterized model 38 and hence, in general, the output of the non-linear approximator 36 may not be directly available. It is expected that the complexities of the real world process plant 16 may dictate the need for the training of the non-linear approximator 36 in a majority of the applications.

A preferred methodology for training the non-linear approximator 36 within the PUNDA architecture of FIG. 3 is to formulate the training of the parameters as a constrained non-linear programming problem. This constrained non-linear programming problem may then be solved with any appropriate non-linear programming solver.

The present modeling approach focuses on successful optimization and control by accurately capturing both process gains and dynamics. To ensure the high fidelity of the PUNDA model 34 for optimization and control, the constrained non-linear programming problem for the training of the non-linear approximator 36 may include constraints on the derivatives (of any desired order) of the process outputs 22 with respect to the process inputs 24. Other constraints, for example, mass and energy balances, may also be included. Potential sources of information for such constraints include first principle models and operator knowledge. A variety of techniques may be used to translate such information into constraints for the non-linear programming problem. For example, one approach is to use software to derive analytical expressions for the first (or higher order) derivatives of the outputs with respect to the inputs in extremely sophisticated first principle models. The derived expressions may then be included in the constraint set for the non-linear programming problem of training. In addition to the derivative constraints (e.g., gain constraints), the training of the PUNDA model 34 may be constrained to ensure desired dynamic behavior for the PUNDA model 34. For example, a time constant in the system may be bounded to a certain range based on prior knowledge about the physics of the process plant 16.

In the PUNDA model 34, the notion of decomposing the non-linear dynamic behavior of the process plant 16 into linear (or even non-linear) dynamics and static input/output mappings is avoided. Rather, in the PUNDA model 34, the identification of the dynamic behavior of the process plant 16 and the input/output static mappings (i.e. gain relationships) are performed simultaneously. The non-linear approximator 36 in the PUNDA model 34 specifies how the parameters of the dynamic parameterized model 38 (e.g., the MIMO difference equation block) may vary as a function of process operating conditions, and gain and dynamic behavior of the PUNDA model 34 is a global property of the entire PUNDA model 34. Therefore, a desired gain behavior may be enforced on the training of the PUNDA model 34 in precisely the same way that a desired dynamic behavior is enforced.

Returning now to FIG. 2, the output of the PUNDA model 34 will be one or more facets of parametric multifaceted models 26 which enable the integrated process plant optimization and control system 10 always to function using an appropriate level of detail for the process plant 16, depending on the particular function. For example, in some instances, the integrated process plant optimization and control system 10 may only need a less-detailed view of the process plant 16, which may be provided by a short-cut model 32. Whereas, in other instances, the integrated process plant optimization and control system 10 may need a more detailed view of the process plant 16, which may be provided by a dynamic model 28. As such, the parametric multifaceted models 26 may always be capable of functioning using an appropriate level of detail within a time horizon which may, for example, enable control of the process plant 16 by the control system 14.

Figure 4:
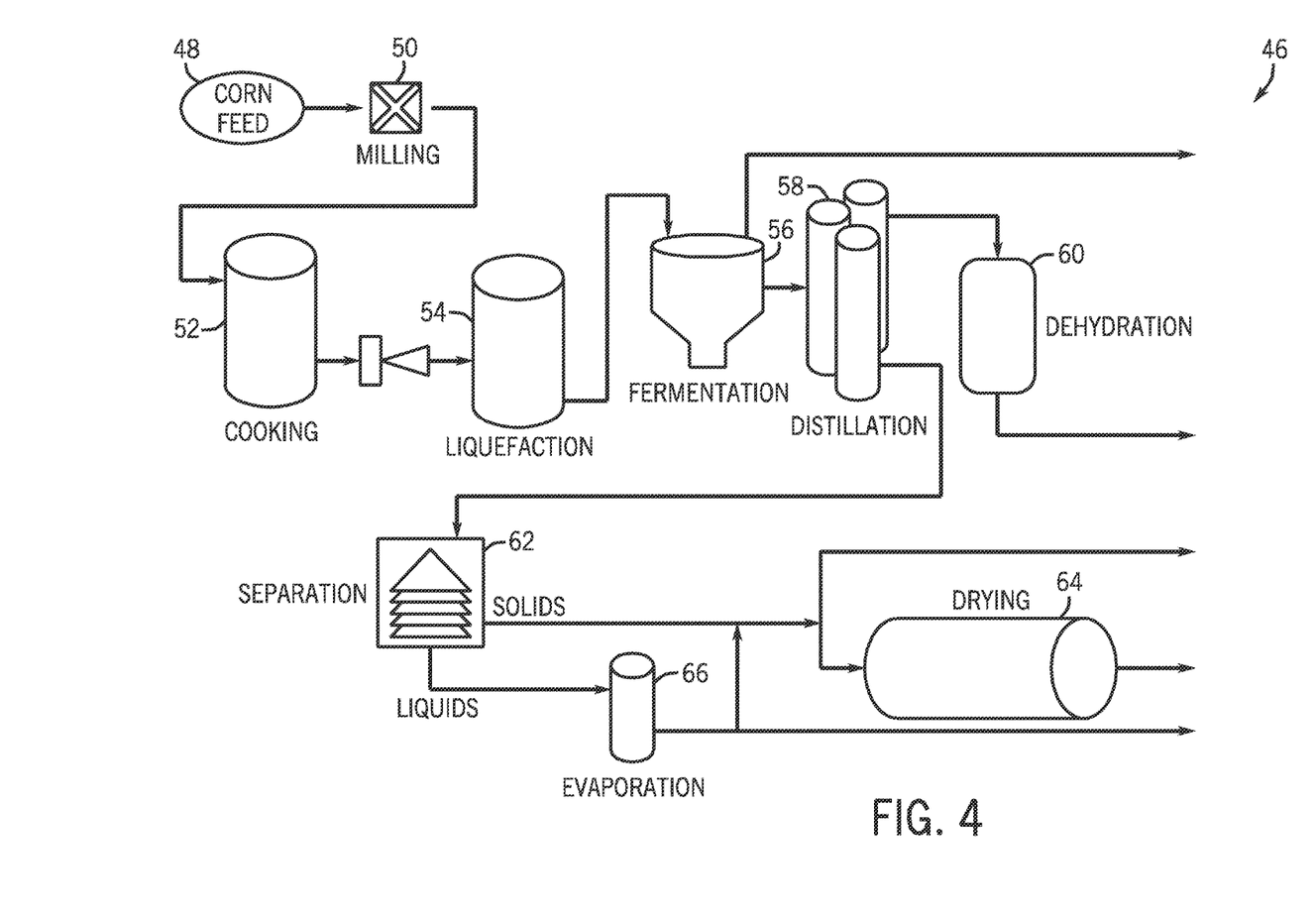
FIG. 4 is a block diagram of an exemplary embodiment of an ethanol production plant, which may use the integrated process plant optimization and control system of FIG. 1.

The following is an illustrative example of the types of models generated as part of the parametric multifaceted models 26. The techniques described herein may be applied to various process plants 16, both upon initial commissioning, and as a retrofit. For example, FIG. 4 is a block diagram of an exemplary embodiment of an ethanol production plant 46, which may use the integrated process plant optimization and control system 10 of FIG. 1. There are currently approximately 134 ethanol production plants in the United States with a production capacity of nearly 7.2 billion gallons per year, with an additional 6.2 billion gallons per year capacity under construction. Approximately two-thirds of these are dry-mill production facilities.

In the ethanol production plant 46, corn feed 48 is provided to milling and cooking processes 50, 52 where it is broken down chemically to increase the surface area to volume ratio. This increase in surface area allows for sufficient interaction with water to achieve a solution of fermentable sugars, known as beer mash. The beer mash is heated to promote an increase in the amount of biomass-water contact in solution and to increase the separation of carbohydrate biomass from the non-carbohydrate biomass. Enzymes, such as alpha-amylase, are typically added in a liquefaction process 54 to promote further breakdown of long-chained carbohydrate polymers. The beer mash is then sent to a fermentation process 56, where several fermentation tanks operate to ferment the beer mash slurry.

The beer mash is typically pumped into the fermentation tanks along with a propagation mixture consisting of yeast, a second enzyme (e.g., glucoamylase), a nitrogen source, and an antibiotic. While in the fermentation tanks, the glucoamylase converts dextrins to dextrose, which the yeast then converts to primary products of ethanol, carbon dioxide, and heat. A number of fermentation tanks are used on a rotating basis, providing a continuous flow through the ethanol production plant 46. The batch time in each fermentation tank is determined by the beer mash flow through the ethanol production plant 46.

The output from the fermentation process 56 is sent to a distillation process 58 to separate ethanol from water, carbon dioxide, and non-fermentable solids (i.e. stillage). The ethanol is further dehydrated in dehydration units 60 to moisture levels less than 5% by a particular processing unit called a molecular sieve. The final 200-proof ethanol is then processed to ensure it is denatured and not used for human consumption.

Stillage (e.g., non-fermentable solids and yeast residue), the heaviest output of the distillation process 58, is sent to stillage processing units 62 for further processing of co-products from the ethanol production plant 46. The stillage processing units 62 separate additional water from the cake solids and recycle the water back to the milling and cooking units 50, 52. Centrifuges are used to remove excess water (e.g., thin stillage) from the distillers grain and this product can be sold as wet cake consisting of approximately 65% moisture. The wet cake can be further processed by dryers 64 to approximately 10% moisture and sold as dried distillers grain.

A portion of the thin stillage liquids may be recycled back to the fermentation process 56. However, the bulk of the flow is generally sent to evaporator units 66, where more liquid is separated from the liquid stream, causing the liquid stream to concentrate into syrup, which may then be sent to a syrup tank. The syrup can be processed in various ways. For example, it may be sprayed into the dryers 64 to a specified color or moisture. Further, it may be added to the partially dried stillage product, or it may be sold as a liquid product.

An energy center supplies energy to the various processing units, for instance, the milling and cooking units 50, 52, the distillation and mole-sieve units 58, and the stillage processing units 62. The energy center typically constitutes a thermal oxidizer unit and heat recovery steam generator that provides steam to the processing units. The energy center is typically the largest source of heat in the ethanol production plant 46.

To demonstrate the use of parametric multifaceted models 26 for the integrated process plant optimization and control system 10, the focus will be on the dryers 64 of the ethanol production plant 46. The dryer dynamics for control purposes may be described as follows:

$$\frac{\partial X_{s,out}}{\partial t} + \frac{V_s(X_{s,out} - X_{s,in})}{L} = -R_w \quad \text{(Eq. 1)}$$

$$C_s\left(\frac{\partial T_{s,out}}{\partial t}\right) + \frac{V_sC_s(T_{s,out} - T_{s,in})}{L} = \left(\frac{U_vV_v}{F_s}\right)(T_{g,out} - T_{s,out}) - \lambda R_w \quad \text{(Eq. 2)}$$

$$C_g\left(\frac{\partial T_{g,out}}{\partial t}\right) + \frac{V_gC_g(T_{g,out} - T_{g,in})}{L} = -\left(\frac{U_vV_v}{F_g}\right)(T_{g,out} - T_{s,out}) - \lambda\left(\frac{F_s}{F_g}\right)R_w \quad \text{(Eq. 3)}$$

where $X_{s,out}/X_{s,in}$ is the solid moisture at the exit/entrance of the dryers 64, $V_s$ is the linear velocity of the solids in an axial direction, L is the dryer length, $R_w$ is the drying rate, $T_{s,out}/T_{s,in}$ is the solid temperature at the exit/entrance of the dryers 64, $C_s$ is the heat capacity of the solids, $U_v$ is the volumetric heat transfer coefficient, $V_v$ is the drum volume per unit length, $F_s$ is the linear density of the solids, $\lambda$ is the heat vaporization of the water, $T_{g,out}/T_{g,in}$ is the drying air temperature at the exit/entrance of the dryers 64, $C_g$ is the heat capacity of the drying air, and $F_g$ is the linear density of the drying air. It should be noted that $R_w$ is a non-linear function of solid characteristics and drying air temperature.

Historically, the control of the dryers 64 has proven to be difficult due to the long time delays involved. In particular, disturbances in input moisture content, temperature, or flow of the solids will disturb the process for long periods of time, and the disturbances are usually not observable until they are measured at the exit of the dryers 64. Therefore, the control scheme often includes both feedback and feedforward components. The most common control loop is the control of fuel flow based on the moisture content of the output solids. A combined feedforward and feedback control strategy may include loops for fuel flow, residence time, rotational speed of the drum, drying air flow, and mass flow, among others.

For the economic optimization of the ethanol production plant 46, however, the main variable of interest may be the moisture content of the solids at the exit of the dryers 64 and the production rate of the final dried distillers grain. The energy consumption that is associated with this level of production and drying, along with the specification and price for the wet versus dried solids, contribute to the optimum solution for the dryers 64. More specifically, a shortcut model 32 for economic optimization of the ethanol production plant 46 may include the following mass balance equations for the water and ethanol content of the solids entering/exiting the dryers 64:

$$\text{Exit\_WaterComponent}=(1-\varepsilon_{H2O})\text{Input\_Water Component} \quad \text{(Eq. 4)}$$

$$\text{Exit\_EthanolComponent}=(1-\varepsilon_{eth})\text{Input\_Ethanol Component} \quad \text{(Eq. 5)}$$

where $\varepsilon_{H2O}$ and $\varepsilon_{eth}$ are the coefficients that depend on the controller performance in removing the water and ethanol from the solids.

A parametric multifaceted model 26 may systematically relate the shortcut models 32 for economic optimization (e.g., Equations 4 and 5) to the detailed dynamic models 28 for control (e.g., Equations 1-3) by explicitly modeling $\varepsilon_{H2O}$ and $\varepsilon_{eth}$ as functions of the manipulated variables that control $X_{s,out}/X_{s,in}$ in Equation 1 (e.g., as a function of fuel flow and/or mass flow). In general, more complex relationships may be needed to properly represent the controller performance in the economic optimization of the ethanol production plant 46. It should be noted that the controller constraints in the achievable moisture level in the exit of the dryers 64 (e.g., due to the temperature constraints) may be easily reflected in constraints on $\varepsilon_{H2O}$ and $\varepsilon_{eth}$ and, hence, may maintain the consistency of the economic optimization with the dryer controller performance.

Figure 5:
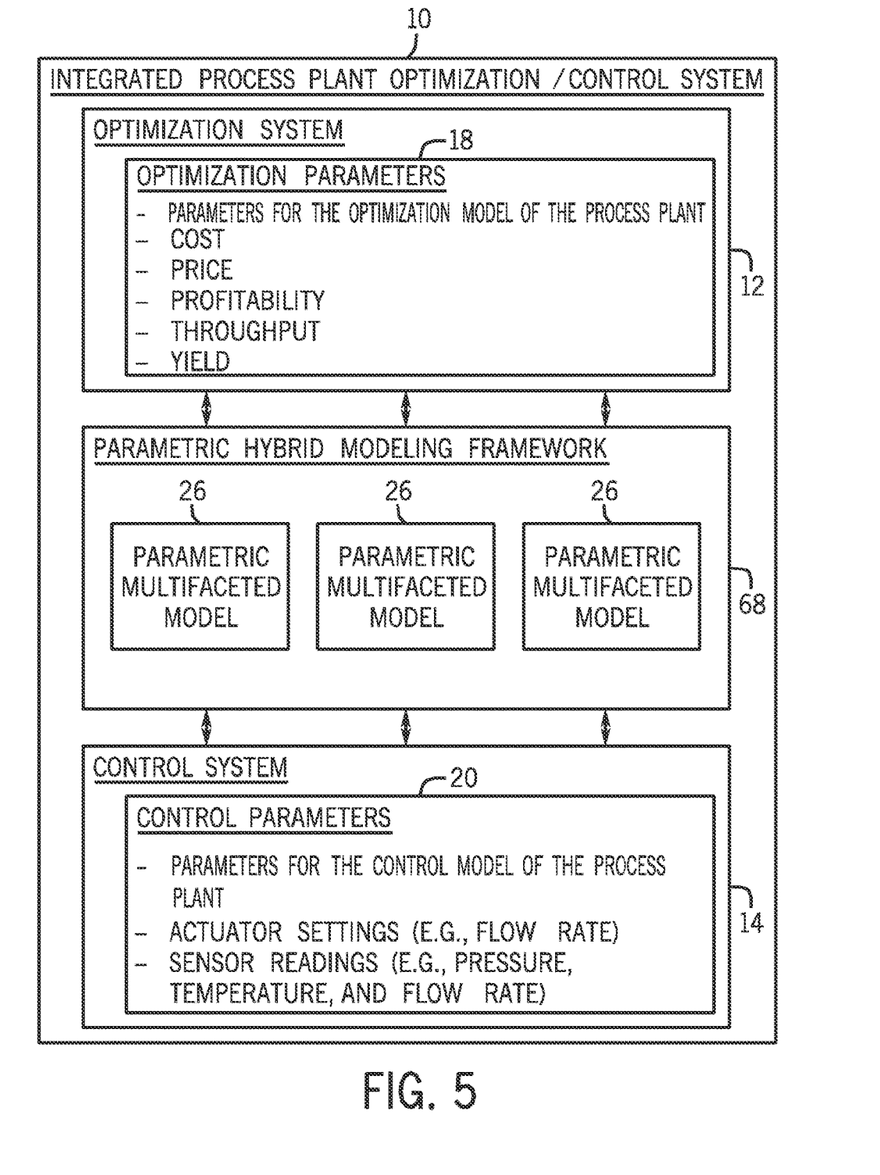
FIG. 5 is a block diagram of an exemplary embodiment of the integrated process plant optimization and control system having a parametric hybrid modeling framework for managing the various parametric multifaceted models of FIG. 2.

As described above, there may be more than one parametric multifaceted model 26 used for a specific process plant 16 or series of process plants 16. As such, a framework for managing the various parametric multifaceted models 26 may be used. FIG. 5 is a block diagram of an exemplary embodiment of the integrated process plant optimization and control system 10 having a parametric hybrid modeling framework 68 for managing the various parametric multifaceted models 26 of FIG. 2. While the context of the optimization system 12 generally determines the appropriate model type, the ability to consistently define, update, and maintain relevant models in the proper context may present a significant challenge. This parametric hybrid modeling framework 68 may include a software framework in which various parametric multifaceted models 26 are defined, modified, deployed (e.g., in a variety of contexts that include offline simulation, software online analysis, and online optimization), and maintained.

More specifically, the parametric hybrid modeling framework 68 accommodates efficient definition of parametric multifaceted models 26 in a manner that is intuitive for the particular model type (i.e., dynamic model 28, parametric steady-state model 30, or short-cut model 32). The software enables the user to view, probe, and deploy various views of the parametric multifaceted model 26 and allows for programmatic tracing of a specific view of the parametric multifaceted model 26 wherever it is used (e.g., a combined model, a deployed optimization solution, or a simulation model).

The parametric hybrid modeling framework 68 also accommodates easy and seamless online and offline modification of parametric multifaceted models 26. Robust online modification of the parameters of each model may prove to be instrumental to the successful implementation of the integrated process plant optimization and control system 10. The parametric hybrid modeling framework 68 may allow for constrained modification of the parameters of the parametric multifaceted models 26 where the constraints are modifiable programmatically via the parametric hybrid modeling framework 68. Of particular significance may be logical constraints that the parametric hybrid modeling framework 68 correctly includes in the optimization problem statements.

The parametric hybrid modeling framework 68 also enables combining parametric multifaceted models 26 into parametric multifaceted models 26 for proper optimization and control contexts. The connectivity information in the combined model may be maintained in a transparent manner. The ability to build a transparent hierarchy of parametric multifaceted models 26 may prove beneficial to the success of the integrated process plant optimization and control system 10. This is in part due to the fact that, in certain applications, oftentimes the sheer size of the process plant model may pose a significant challenge in model management.

One of the beneficial aspects of the disclosed embodiments is constrained modification of the parametric multifaceted models 26 for optimization and control computations. Process plants 16 are typically extremely dynamic entities. The behavior of process plant optimization and control modules may vary as a function of dynamic process plant operating conditions. Changing market conditions will affect the cost of raw material, the cost of energy, the demand for the products, the price of the goods sold, and so forth. The integrated process plant optimization and control system 10 is equipped to handle this dynamic nature of process plants 16. In particular, the disclosed embodiments enable constrained modification of the optimization system 12, which may include models for process plant modules, models of operation constraints, and operation priorities and objectives, among others. The constrained modification may be accomplished in both an adaptive manner (e.g., via modification of a present time representation of the process plant 16) and a predictive manner (e.g., via modification of a representation of the process plant 16 over a relevant decision/prediction horizon). The constrained modification may be based on both the current state of the process plant 16 and an anticipated and/or planned profile over a decision horizon. A representative example of the need for constrained modification of process plant models for the integrated process plant optimization and control system 10 is the case where the optimization system 12 determines a new production level within a given time frame in a polymer process and needs to correctly account for the potentially large variation in delays as a function of production level.

Another beneficial aspect of the disclosed embodiments is the ability to provide a computationally efficient solution of the optimization and control problems in a relevant time horizon through systematic model order reduction and coordinated modular optimization. In the past, timely conclusion of the computations involved in optimization and control of process plants 16 has proven to be an obstacle to the successful deployment of integrated optimization and control solutions. The disclosed embodiments address this challenge by providing efficient model order reduction using the parametric multifaceted models 26 such that the resulting optimization problems are of considerably lower dimension allowing, for instance, optimization parameters to be generated in a time horizon allowing for substantially real-time control of the process plant 16 by the control system 14. One example is the use of a model for steady-state representation of a complex process plant 16 where a combination of actual and artificially-generated process plant data are used to consolidate the steady-state view of the complex process plant 16 into a computationally efficient steady-state model that will serve as one view of the combined parametric multifaceted model 26 for the complex process plant 16.

In addition, the disclosed embodiments address the computational efficiency challenge posed by the scale of integrated optimization and control problems by, among other things: (1) allowing simultaneous use of multiple solver technologies for various optimization problems, (2) enabling timely communication of models and constraints among various optimization problems through appropriately defined parameters in each model, and (3) enabling traceability for the constraints and parameter modifications throughout various optimization problems as a result of the transparent manner by which the parametric multifaceted models 26 are maintained by the parametric hybrid modeling framework 68. The ability of the parametric hybrid modeling framework 68 to programmatically identify proper model types, relevant constraint sets, solver types, and initial guesses for the solution are a key feature of the disclosed embodiments. In fact, the disclosed embodiments provide a framework for the implementation of a distributed integrated process plant optimization and control system 10 throughout a complex process plant 16, since the parametric hybrid modeling framework 68 will maintain and manage the integrated process plant optimization and control system 10, including the models, problem descriptions, solvers, and initial conditions.

The disclosed embodiments may prove beneficial in a wide variety of real world applications including, but not limited to, economically-driven process plant operation, optimal execution of a production plan, and integrated optimization and control of multiple process plants 16. With respect to economically-drive process plant operation, the optimization system 12 may determine setpoints for the control system 14 based on economic objectives of the process plant 16. For example, the product type and production level for each product may be determined by the optimization system 12 given the cost of raw materials, energy cost, price of the product in the market, and so forth. With respect to optimal execution of a production plan, a given number of products may be planned for production by the process plant 16 by a given deadline. In this case, the optimization system 12 may determine the optimal production sequence for the process plant 16 given production capability and constraints of the process plant 16. With respect to integrated optimization and control of multiple process plants 16, multiple production facilities may be viewed as assets for enterprise-wide optimization of manufacturing operations.

Figure 6:
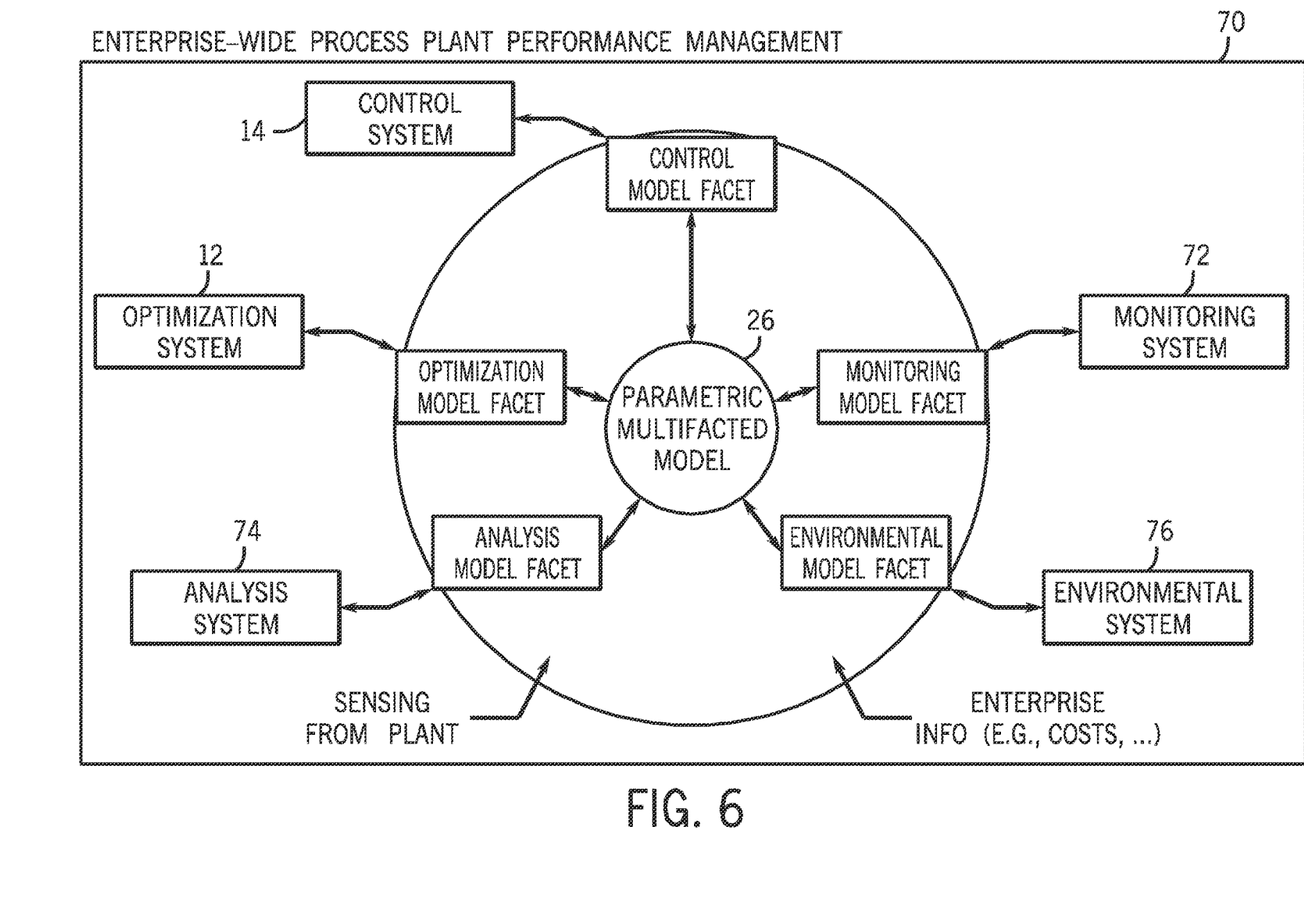
FIG. 6 is a block diagram of an exemplary enterprise-wide process plant architecture, within which the integrated process plant optimization and control system of FIG. 1 may be utilized.

The integrated process plant optimization and control system 10 may be a part of a broader enterprise-wide architecture for managing process plants 16. For instance, FIG. 6 is a block diagram of an exemplary enterprise-wide process plant architecture 70, within which the integrated process plant optimization and control system 10 of FIG. 1 may be utilized. As illustrated, in addition to the optimization system 12 and the control system 14 discussed above, the enterprise-wide process plant architecture 70 may also include a monitoring system 72, an analysis system 74, and an environmental system 76, among others. As illustrated, each of these systems may include there own respective parametric multifaceted model facets. The monitoring system 72 may be used to monitor the operations of the process plants 16 as well as monitoring the other systems of the enterprise-wide process plant architecture 70 to ensure that they are receiving accurate information and adequately acting upon the information. The analysis system 74 may be somewhat related to the other systems of the enterprise-wide process plant architecture 70 in that the analysis system 74 may provide some of the analysis used by these systems. The environmental system 76 may include software for ensuring that the process plants 16 comply with environmental regulatory conditions. The illustrated systems of the enterprise-wide process plant architecture 70 are merely exemplary and not intended to be limiting. All of the illustrated systems of the enterprise-wide process plant architecture 70 may be modular and may include combinations of software and hardware solutions. Furthermore, in certain embodiments, these systems may be digitally linked together.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   a parametric multifaceted model of a plurality of process plants configured to receive inputs from the process plants, and to map between a first set of parameters relating to a first facet of the parametric multifaceted model of the process plants and a second set of parameters relating to a second facet of the parametric multifaceted model of the process plants;
   an optimization system configured to optimize integrated operation of the process plants using the second set of parameters and a first parameterized input/output control model, wherein the first parameterized input/output control model comprises a short-cut model; and
   a control system configured to control integrated operation of the process plants using the first set of parameters and a second parameterized input/output control model, wherein the second parameterized input/output control model comprises a detailed dynamic model,
   wherein the first set of parameters is different than the second set of parameters and mapping between the first set of parameters and the second set of parameters facilitates maintaining consistency between the first parameterized input/output control model and the second parameterized input/output control model, wherein the mapping between the first set of parameters and the second set of parameters is a function of current and/or anticipated operating conditions of the process plants and occurs over a time horizon during operation of the process plants to facilitate control of the process plants; and
   wherein the parametric multifaceted model comprises a parametric non-linear dynamic approximator and a dynamic parameterized model coupled in series.

2. The system of claim 1, wherein the first set of parameters comprise control parameters used by the control system and the second set of parameters comprise optimization parameters used by the optimization system.

3. The system of claim 2, wherein the optimization parameters comprise production facility constraints, throughput limits, equipment efficiency, or a combination thereof.

4. The system of claim 2, wherein the control parameters comprise reaction rates, process gains, process residence times, sensor readings, actuator settings, or a combination thereof.

5. The system of claim 1, wherein the parametric multifaceted model is configured to map the second set of parameters into the first set of parameters.

6. The system of claim 1, wherein the plurality of process plants comprises an ethanol production plant.

7. A system comprising:
   a parametric multifaceted model of a process plant configured to receive inputs from the process plant, and to map between a first set of parameters relating to a first facet of the parametric multifaceted model of the process plant and a second set of parameters relating to a second facet of the parametric multifaceted model of the process plant;
   an environmental system configured to determine whether a process plant is operating in compliance with environmental regulatory conditions using the first set of parameters;
   a control system configured to control operation of the process plant using the second set of parameters and a first parameterized input/output control model;
   an optimization system configured to optimize operation of the process plant using a third set of parameters and a second parameterized input/output control model;
   wherein the first set of parameters is different than the second set of parameters and mapping between the first set of parameters and the second set of parameters facilitates maintaining consistency between the environmental system and the control system, wherein the mapping between the first set of parameters and the second set of parameters is a function of current and/or anticipated operating conditions of the process plant and occurs over a time horizon during operation of the process plant to facilitate control of the process plant; and
   wherein the first parameterized input/output control model comprises a short-cut model and the second parameterized input/output control model comprises a detailed dynamic model.

8. The system of claim 7,
   wherein the parametric multifaceted model is configured to map between the first set of parameter, the second set of parameters, and the third set of parameters, wherein the first set of parameters, the second set of parameters, and the third set of parameters are each different from one another, mapping between the first set of parameters, the second set of parameters, and the third set of parameters facilitates maintaining consistency between control system, the optimization system, and the environmental system, and the mapping between the first set of parameters, the second set of parameters, and the third set of parameters is a function of current and/or anticipated operating conditions of the process plant and occurs over a time horizon during operation of the process plant to facilitate controlling the process plant.

9. The system of claim 7, comprising:
   an analysis system configured to provide analysis used by the environmental system, the control system, or both using a third set of parameters;

wherein the parametric multifaceted model is configured to map between the first set of parameter, the second set of parameters, and the third set of parameters, wherein the first set of parameters, the second set of parameters, and the third set of parameters are each different from one another, mapping between the first set of parameters, the second set of parameters, and the third set of parameters facilitates maintaining consistency between control system, the analysis system, and the environmental system, and the mapping between the first set of parameters, the second set of parameters, and the third set of parameters is a function of current and/or anticipated operating conditions of the process plant and occurs over a time horizon during operation of the process plant to facilitate controlling the process plant.

10. The system of claim 7, wherein:
a monitoring system configured to monitor operation of the process plant, the environmental system, the control system, or any combination thereof using a third set of parameters;
wherein the parametric multifaceted model is configured to map between the first set of parameter, the second set of parameters, and the third set of parameters, wherein the first set of parameters, the second set of parameters, and the third set of parameters are each different from one another, mapping between the first set of parameters, the second set of parameters, and the third set of parameters facilitates maintaining consistency between control system, the monitoring system, and the environmental system, and the mapping between the first set of parameters, the second set of parameters, and the third set of parameters is a function of current and/or anticipated operating conditions of the process plant and occurs over a time horizon during operation of the process plant to facilitate controlling the process plant.

11. The system of claim 7, wherein the parametric multifaceted model comprises a detailed dynamic model, a steady-state model, and a short-cut model.

12. The system of claim 7, wherein the parametric multifaceted model comprises a parametric non-linear dynamic approximator and a dynamic parameterized model coupled in series.

13. The system of claim 7, wherein the process plant is an ethanol production plant.

14. A tangible, non-transitory, computer-readable medium configured to store instructions executable by a processor of a process plant, wherein the instructions comprise instructions to:
map, using the processor, between a first set of parameters relating to a first facet of a parametric multifaceted model of the process plant and a second set of parameters relating to a second facet of the parametric multifaceted model of the process plant, wherein the first set of parameters is different than the second set of parameters;
map, using the processor, between a third set of parameters relating to a third facet of the parametric multifaceted model of the process plant, the first set of parameters, and the second set of parameters, wherein the third set of parameters is different than the first set of parameters and the second set of parameters;
optimize, using the processor, operation of the process plant using the second set of parameters and a first parameterized input/output control model with an optimization system, wherein the first parameterized input/output control model comprises a short-cut model;
determine, using the processor, whether the process plant is operating in compliance with environmental regulatory conditions using the third set of parameters with an environmental system; and
control, using the processor, operation of the process plant using the first set of parameters and a second parameterized input/output control model with a control system, wherein the second parameterized input/output control model comprises a detailed dynamic model, wherein:
mapping between the first set of parameters and the second set of parameters facilitates maintaining consistency between the first parameterized input/output control model and the second parameterized input/output control model;
mapping between the first set of parameters and the second set of parameters is a function of current operating conditions of the process plant, anticipated operating conditions of the process plant that occur over a time horizon during operation of the process plant, or both; and
mapping between the first set of parameters, the second set of parameters, and the third set of parameters facilitates maintaining consistency between the control system, the optimization system, and the environmental system.

15. The computer-readable medium of claim 14, comprising instructions to:
map, using the processor, between a third set of parameters relating to a third facet of the parametric multifaceted model of the process plant, the first set of parameters, and the second set of parameters;
determine, using the processor, analysis used by an enterprise system using the third set of parameters with an analysis system;
wherein the first set of parameters, the second set of parameters, and the third set of parameters are each different from one another; and mapping between the first set of parameters, the second set of parameters, and the third set of parameters facilitates maintaining consistency between the control system, the optimization system, and the analysis system.

16. The computer-readable medium of claim 14, comprising instructions to:
map, using the processor, between a third set of parameters relating to a third facet of the parametric multifaceted model of the process plant, the first set of parameters, and the second set of parameters;
monitor, using the processor, operation of the process plant using the third set of parameters with a monitoring system;
wherein the first set of parameters, the second set of parameters, and the third set of parameters are each different from one another; and mapping between the first set of parameters, the second set of parameters, and the third set of parameters facilitates maintaining consistency between the control system, the optimization system, and the monitoring system.

17. The computer-readable medium of claim 16, wherein the instructions to optimize integrated operation of the process plant comprises instructions to determine produce type, production level, or both of the process plant.

* * * * *